Jan. 29, 1952

R. G. KUGLER 2,583,954

TURNTABLE CONSTRUCTION

Filed Jan. 3, 1949

INVENTOR
ROBERT G. KUGLER
By Toulmin & Toulmin
ATTORNEYS

Patented Jan. 29, 1952

2,583,954

UNITED STATES PATENT OFFICE 2,583,954

TURNTABLE CONSTRUCTION

Robert G. Kugler, Springfield, Ohio, assignor to Kugler's Radio Service, Inc., Springfield, Ohio, a corporation of Ohio Application January 3, 1949, Serial No. 68,871

4 Claims. (Cl. 274—9)

This invention relates to speed changing devices, and particularly to speed changing devices especially adapted for use in connection with sound reproducing devices such as phonographs and the like.

In phonographs for home use and the like for playing disk records there is provided a rotary turntable that is driven at a predetermined speed. Most of these records have been made for a turntable speed of 78 revolutions per minute, and, accordingly, most turntables operate at that speed. There is another type disk record, however, that is made to operate at a speed of 33⅓ revolutions per minute, and this type recording is becoming more and more popular due to the fact that it has a much longer playing time, and the investment for any given amount of recordings is considerably less than with the other style record.

At the present time many people cannot take advantage of these new recordings because it would be necessary for them to purchase an entire new phonograph. Accordingly, the primary object of this invention is to provide an adapter device for mounting on the turntable of a phonograph and including an auxiliary turntable which is driven at the proper speed for playing the improved low speed disk records.

It has been attempted to provide a phonograph with control means so that the turntable can be operated at either of the two above mentioned speeds. These constructions, however, have been expensive and troublesome and have never met with approval by the buying public. There have also been attempts to construct adapter devices, similar in intended function to that of the instant invention, but these have either been expensive or bulky or have been unsatisfactory in operation, and have likewise not met with any wide success.

It is thus also an object of this invention to provide an improved adapter construction for a rotary phonograph turntable or the like which is inexpensive to manufacture and which is not bulky and cumbersome.

A still further object of this invention is to provide an adapter construction for a rotary phonograph table having improved driving and journaling means such that the adapter turntable rotates at a uniform speed, thereby eliminating variations in the quality of the reproduction of the recording.

In addition to manufacturing phonographs having tables which rotate at 78 revolutions per minute, there are also manufactured phonographs having tables which rotate at 33⅓ revolutions per minute. Each of these constructions is adapted for playing only one type of recording. The disadvantage of having only one speed of turntable available is the same for a phonograph having a low speed turntable as referred to above in connection with the high speed turntable.

It is, therefore, a still further object of this invention to provide a turntable adapter for use with either a 78 revolutions per minute turntable or a 33⅓ revolutions per minute turntable and effective for changing either of the said speeds to the other.

Phonographs may be constructed to play a single record or may be adapted for playing a series of records, the latter being known as automatic record changers. Ordinarily, the last mentioned type of phonograph includes an elongated center pin on which the records are mounted which are to be played. Inasmuch as the problem of mounting an adapter on a turntable when the center pin is short is different than when the center pin is long, it is an object of this invention to provide an improved adapter construction for phonograph turntables and the like which can be used with either an automatic recording changing type phonograph or one which plays only a single record at a time.

These and other objects and advantages of this invention will become more apparent upon reference to the following specification taken in connection with the accompanying drawings, in which.

Figure 1:
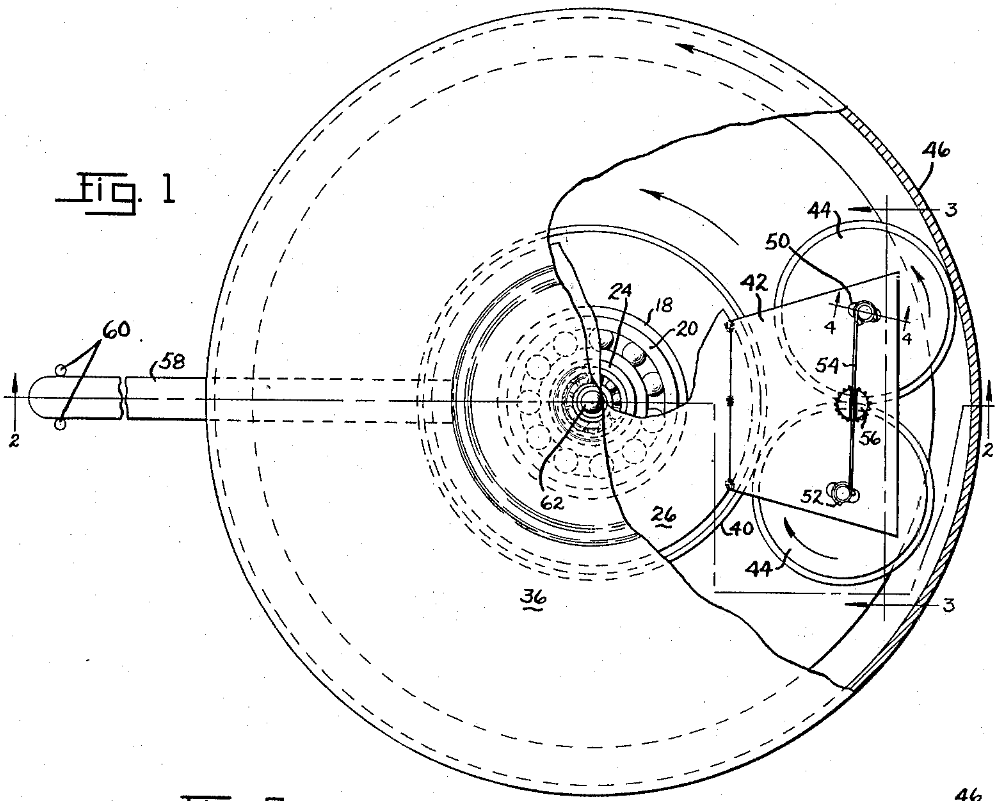
Figure 1 is a plan view partly broken away of an adapter construction according to my invention.
Figure 2:
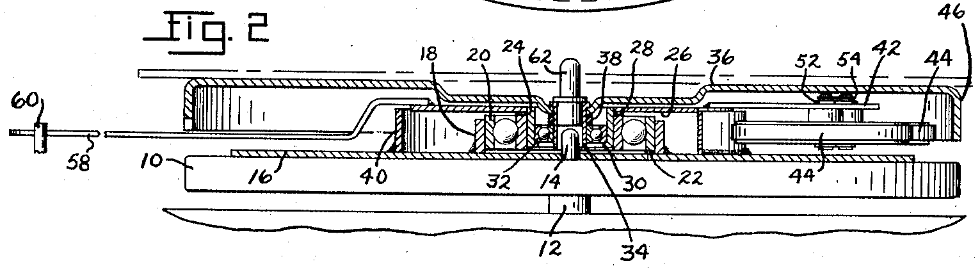
Figure 2 is a vertical section indicated by the line 2—2 on Figure 1.
Figure 3:
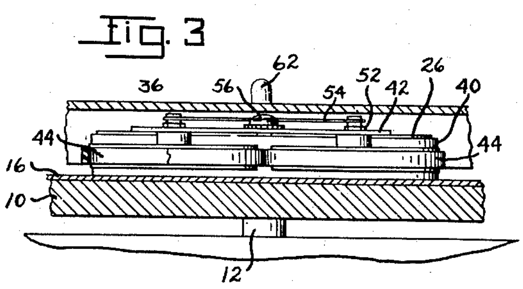
Figure 3 is another vertical section and is indicated by the line 3—3 on Figure 1.

Referring to the drawings somewhat more in detail, and particularly to Figures 1, 2, and 3, the turntable of the phonograph on which the adapter of this invention is to be used is indicated at 10. This turntable is driven as by the shaft 12 extending into the phonograph and, as shown, the turntable 10 is adapted for rotating at a speed of 78 revolutions per minute. Extending upwardly from the center of the turntable 10 is a centering pin 14 on which the records to be played are placed.

The adapter of this invention comprises a first plate 16 having a central aperture therein so that it can be placed on the turntable and over the centering pin 14. The aperture closely engages the pin 14 and the plate 16 is thus centered on the turntable 10. In the center part of the plate 16 there is an upstanding sleeve 18 which receives the anti-friction bearing 20. For the purpose of holding the bearing 20 up off the plate 16 so that the part of the bearing which rotates relative to the plate does not rub thereon, there may be provided a plurality of rivets as at 22 or other upwardly projecting means which engage the outer race of the bearing.

Fitting within the inner race of the bearing 20 is a sleeve 24 and welded or otherwise suitably rigidly affixed to the upper end of the sleeve 24 is an intermediate plate 26. The plate 26 and sleeve 24 are supported in the position shown by means of a washer or spacer member indicated at 28 and which bears between the plate 26 and the inner race of the bearing 20.

The lowermost end of the sleeve 24 is turned in as at 30 and forms a shoulder for supporting the anti-friction bearing 32 which closely fits within the sleeve 24.

A smaller bearing sleeve 34 is receivable inside the inner race of the bearing 32 and at its upper end engages the upper plate or turntable 36 of the adapter. A spacing washer 38 provides that the turntable 36 and sleeve 34 will be supported on the inner race of the bearing 32 and above the plate 16 so as not to rub thereon.

It will be evident from the foregoing description that the plates 16, 26 and 36 are all supported relative to each other in such a manner that they are freely relatively rotatable.

Figure 4:
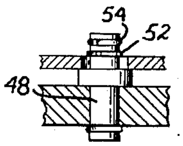
Figure 4 is a fragmentary section indicated by the line 4—4 on Figure 1.

For effecting a driving connection between the plate 16 and the turntable 36, the said plate 16 has secured thereto an upstanding annular rim 40 which may be affixed to the said plate as by welding, brazing, riveting or any other suitable means. This annular flange member 40 is centered relative to the central aperture in the plate 16 due to its rigid connection with the said plate. The plate 26, in turn, supports a member 42 which carries a pair of rubber rimmed drive members 44 which, as best seen in Figure 1, engage the flange 40 and the depending flange 46 on the upper plate or turntable 36. The rubber rimmed rollers 44 are mounted on studs 48, as best seen in Figure 4, and these studs extend through slots 50 in the member 42. The studs are retained in position as by the horseshoe retaining washers 52 and are movable lengthwise of the slots 50 toward and away from the one of the parts 40, 46, which they engage. The spacing of the slots 50 in the member 42 is such that the rubber rimmed rollers bear against each other and it will be evident that rotation of the plate 16 to rotate the flange 40 will cause the lower roller 44, as seen in Figure 1, to rotate, and therethrough to drive the upper roller 44 in Figure 1 and which in turn drives the upper plate or turntable 36 through its depending flange 46.

For urging the rubber rimmed rollers into engagement with the flanges 40 and 46 there is provided a spring 54 which has a loop in each end engaging an annular groove in the upper end of the adjacent stud 48, as will be seen in Figures 3 and 4, and the middle part of which passes through the slot in the screw 56. The screw 56 can be angularly adjusted in order to apply the correct amount of pressure on the rolls 44.

It will be noted that the angle of the slots 50 is such that movement of the rolls 44 therein toward the one of the flanges which they engage is also effective for bringing the rolls themselves together.

It will be evident that in order to effect a driving connection between the plates 16 and 36, the plate 26 must be held stationary. Accordingly, there is an arm 58 secured to the plate 26 and extending out from between the plates 16 and 36, as will be seen in Figure 2, to beyond the outer limits of the turntables. This arm extends between a pair of studs or other abutments as at 60 and is effective for holding the plate 26 stationary.

As mentioned before, this adapter is also adaptable for use in connection with automatic record changer type phonograph, and to this end, the centering pin 62 mounted in the upper plate or turntable 36 is removable from the sleeve 34 in order to permit the longer center pin of the automatic record changer type to pass therethrough.

Figure 5:
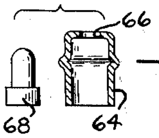
Figure 5 is a view showing adapter members which can be placed in the central openings of the upper and lower plates of the device so either of the plates can be used as the record supporting member.

It has also been mentioned that the adapter of this invention can be used to increase the speed of a low speed turntable. For this purpose the entire adapter is inverted so that the plate or turntable part 36 rests on the turntable of the phonograph, while the plate 16 becomes the new turntable. When the adapter is inverted for use as a speed increasing device, the centering pin 62 is preferably removed and is replaced by the member indicated at 64 in Figure 5. This member fits within the sleeve 34 and has an aperture 66 therein for receiving the center pin of the turntable on which the adapted is placed. Another member indicated at 68 in Figure 5 can be inserted through the sleeve 34 so that the pin part projects through the aperture in the plate 16 and thus provides for a center pin when the plate 16 is used as the turntable.

It is to be noted that when the adapter is inverted for use as explained above the direction of rotation of the turntable 36 is such that a wedging action is had on the drive rolls 44 similarly as when the adapter is used in its upright position. The roll arrangement at 44 and the support therefor thus provides a good driving connection between the plates 16 and 36 at all times.

It will be apparent that certain modifications could be made in the structure shown by those skilled in the art, as, for example, in the particular formation of the bearing sleeves, drive flanges, and driving members. The same advantages would obtain of compactness, smoothness of operation and lower cost.

It will be understood that this invention is susceptible to modification in order to adapt it to different usages and conditions and, accordingly, it is desired to comprehend such modifications within this invention as may fall within the scope of the appended claims.

I claim:

1. In a phonograph turntable adapter: a pair of spaced plates, a member between said plates and having a bearing sleeve, a bearing between said sleeve and each of said plates whereby said plates are rotatable on a common axis and independently of each other and of said member, telescoping flange means on said plates and of different diameters, and friction driving means forming a driving connection between said flange means and carried by said member, said friction drive means comprising a pair of rollers having peripheral drive means and in engagement with each other and one engaging one of said flange means and the other engaging the other of said flange means, said rollers being movably mounted on said member and there being spring means for urging said rollers toward each other and toward their respective driven flanges.

2. In a device for phonograph turntables to enable recordings made to rotate at different speeds to be played thereon: a pair of axially aligned spaced auxiliary turntables, telescoping bearing sleeves of different diameters carried by said auxiliary turntables, a member between said auxiliary turntables and also having a bearing sleeve telescoping the sleeves on said turntables, bearings between said sleeves for journaling said auxiliary turntables on a common axis for rotation independent of each other and of said member, telescoping axial flange means of different diameters on said auxiliary turntables, a pair of friction rollers carried by said member and in engagement with each other and one engaging one of said flange means and the other, the other of said flange means for establishing a driving connection between said auxiliary turntables, and resilient means urging said rollers toward each other and toward the respective flange means which they engage.

3. In a device for being mounted on a phonograph turntable to change the speed thereof: a pair of axially aligned spaced plates forming auxiliary turntables, telescoping bearing sleeves of different diameters carried by said plates, a member between said plates and also having a bearing sleeve telescoping the sleeves on said plates, bearings between said sleeves for journaling said plates on a common axis for rotation independently of each other and of said member, telescoping axial flange means of different diameters on said plates, a pair of friction rollers between said flange means in engagement with each other and one in engagement with each flange to establish a driving connection between said plates, a supporting shaft for each roller, slots in said member for adjustably receiving said shafts, and a spring adjustably carried by said member and engaging said shafts for urging said rollers toward each other and toward the respective flange which they each engage.

4. In a device for being mounted on a phonograph turntable to change the speed thereof: a pair of axially aligned spaced plates forming auxiliary turntables, telescoping bearing sleeves of different diameters carried by said plates, a member between said plates and also having a bearing sleeve telescoping the sleeves on said plates, bearings between said sleeves for journaling said plates on a common axis for rotation independently of each other and of said member, telescoping axial flange means of different diameters on said plates, a pair of friction rollers between said flange means in engagement with each other and one in engagement with each flange to establish a driving connection between said plates, a supporting shaft for each roller, slots in said member for adjustably receiving said shafts, and a spring adjustably carried by said member and engaging said shafts for urging said rollers toward each other and toward the respective flange which they each engage, and an arm secured to said member and extending out beyond the periphery of said plate for holding said member stationary.

ROBERT G. KUGLER.

REFERENCES CITED

The following references are of record in the file of this patent:

UNITED STATES PATENTS

| Number | Name | Date |
|---|---|---|
| 1,852,456 | Fritz | Apr. 5, 1932 |
| 1,915,090 | Hammond | June 20, 1933 |
| 2,353,370 | Sears | July 11, 1944 |